March 26, 1963 R. L. RHOADS 3,082,727
CONTROL SYSTEM FOR WATER CRAFT
Filed May 25, 1960 2 Sheets-Sheet 1
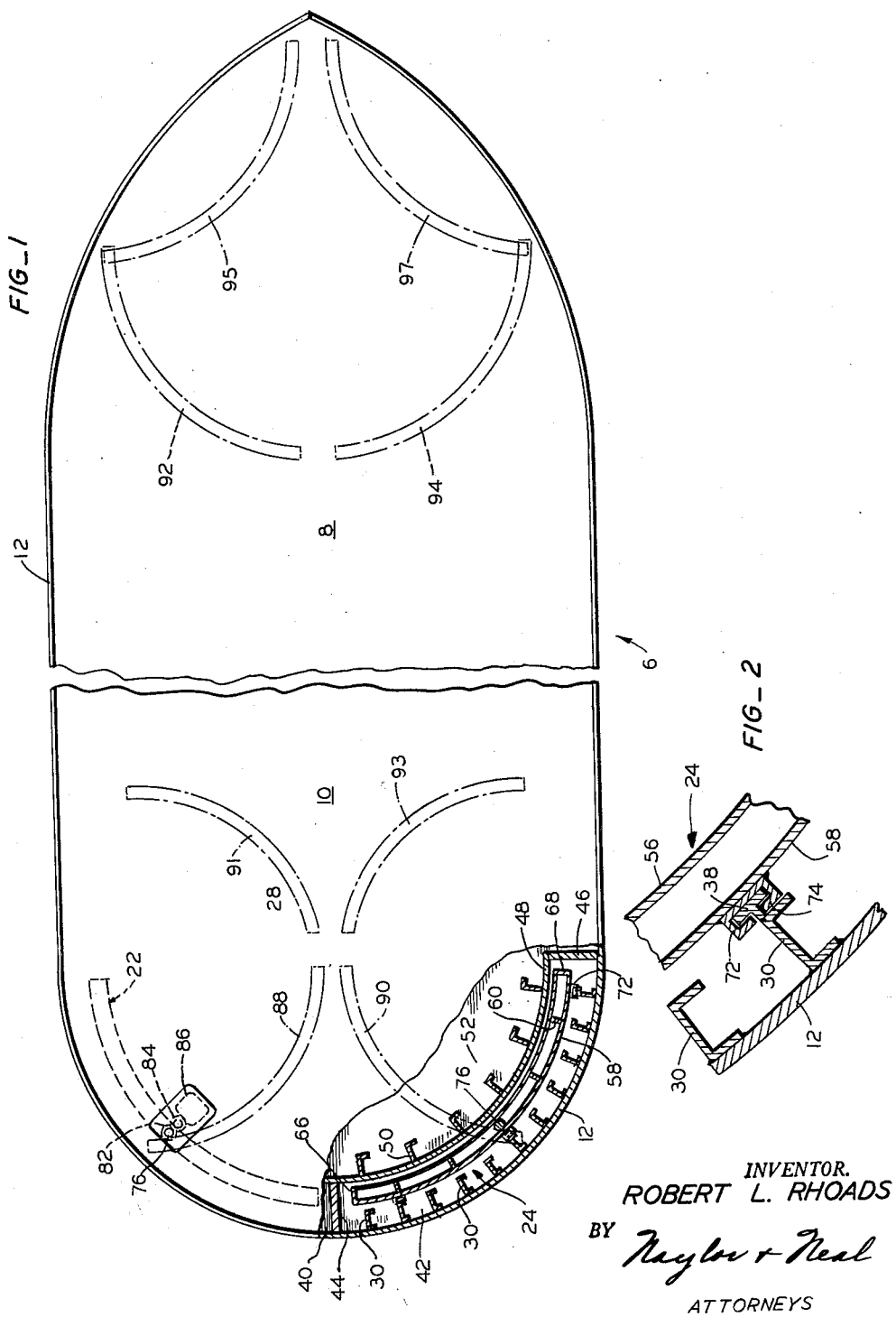
INVENTOR.
ROBERT L. RHOADS
BY Naylor & Neal
ATTORNEYS March 26, 1963  R. L. RHOADS  3,082,727
CONTROL SYSTEM FOR WATER CRAFT
Filed May 25, 1960  2 Sheets-Sheet 2
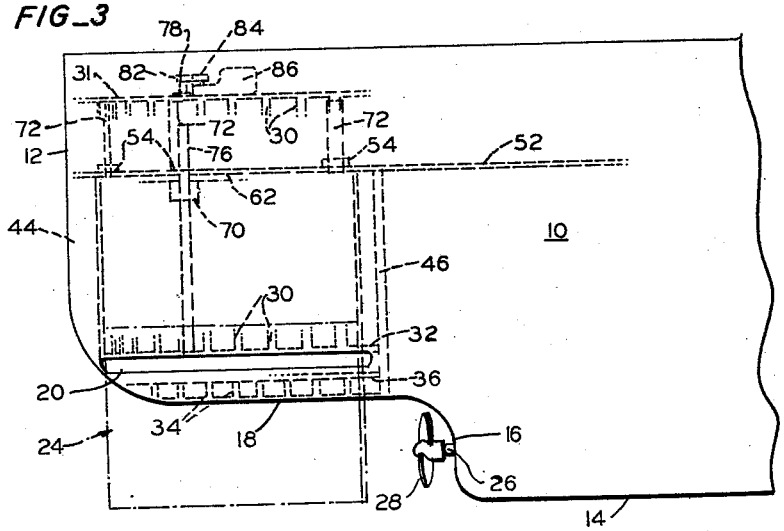
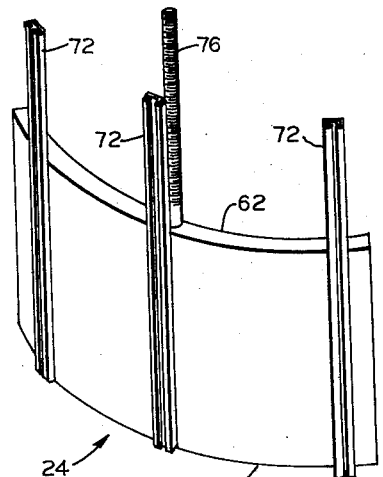
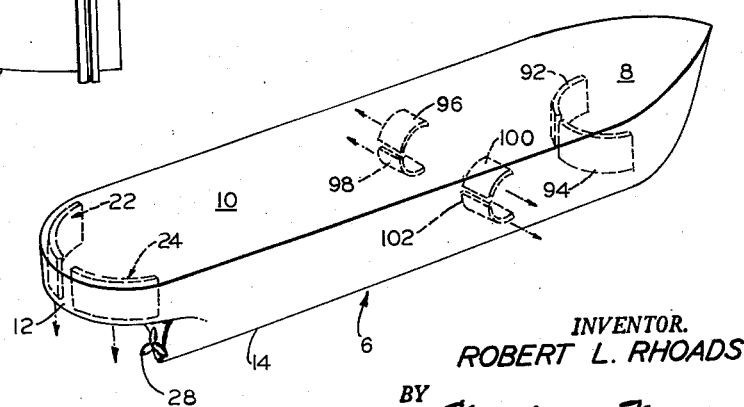
INVENTOR.
ROBERT L. RHOADS
BY Naylor & Neal
ATTORNEYS

United States Patent Office 3,082,727
Patented Mar. 26, 1963

3,082,727
CONTROL SYSTEM FOR WATER CRAFT
Robert L. Rhoads, 143 Jordan Ave., San Anselmo, Calif.
Filed May 25, 1960, Ser. No. 31,709
2 Claims. (Cl. 114—152)

This invention relates to improvements in control systems for vessels and more particularly to a system adapted to the steering and the stablizing of same.

Conventional vessel control systems employ one or more rudder blades mounted for pivotal movement relative to the vessel hull with vessel guidance being effected by varying the angular relation between the rudder blade and the hull longitudinal axis to thereby determine the angle of attack of the blade with the water stream flowing therepast. In such systems the rudders are at all times exposed to the stream flow and the effective control surface area presented is accordingly fixed. Such systems may, therefore, be characterized as of a fixed area variable angle type, in that a rudder blade of constant area is relied upon to effect vessel guidance simply through changing the above blade angular relation, hull response ultimately being limited by the fixed rudder area.

In contrast with the above conventional control systems the control system of this invention may be characterized as being of a variable area fixed angle type, in that the control blades or rudders utilized for vessel guidance and/or stabilization are removably inserted into the stream to project exteriorly of the hull, in which position they are fixed against pivotal movement in a predetermined angular relation with the hull. Blade extension is controllable to permit of variation in the amount of blade area exposed to the stream, and it is by varying such area that the magnitude of the turning moment exerted by the blades upon the vessel is determined.

The invention has amongst its objects the provision of a system capable of effectively controlling the movement of a vessel hull and adapted for use both as a primary and as an auxiliary vessel control means.

Another object of the invention is the provision of a system for vessel control which may also be utilized as a vessel checking or stopping means and which is particularly well adapted to vessel control during slow speed maneuvering.

Still another object of the invention is the provision of a system for vessel control which may be employed for stabilization of the vessel against roll.

A further object of the invention is the provision of a control system employing control surfaces retractable into a vessel hull when not in use to minimize control surface drag during those protracted periods when the control surfaces are not actively employed.

A still further object of the invention is to provide a control system which may be adapted to a wide variety of vessel installations by suitable shaping and positioning of the control blades incorporated into the system, thereby to provide maximum effectiveness in vessel control. The control system thus provides the designer with a far wider latitude in the selection of the form and area of the rudders and their angular orientation to the vessel hull than is available with conventional ship control systems.

Yet a further object of the invention is the provision of a control system which is of simple and rugged construction and may utilize the main side framing of a vessel hull for strength support, and guidance with a minimum of interior hull space loss.

Other objects and advantages of this invention will be apparent from the following description when taken in conjunction with the drawings in which:

FIG. 1 is a view in plan of the bow and stern portions of a vessel embodying the control system of this invention with the starboard stern quarter broken away to disclose interior details;

FIG. 2 is an enlarged fragmentary view in horizontal section illustrating a portion of the rudder blade guidance means employed in the vessel of FIG. 1;

FIG. 3 is a fragmentary view in side elevation of the stern portion of the vessel of FIG. 1, with the broken lines indicating raised or retracted and lowered or extended positions of the rudder blades;

FIG. 4 is a view in perspective of a rudder blade and a portion of the actuating and guidance means therefor; and FIG. 5 is a view in perspective of a vessel embodying the control system of this invention as both steering and stabilizing means.

Referring now to the drawings, and in particular to FIGS. 1 and 5 thereof, there is shown a vessel hull, generally designated by the numeral 6, comprised of a bow portion 8 and a rearwardly undercut stern portion 10. The hull 6 is of conventional steel construction with a skin 12 comprised of steel side plating. Although the hull and the control system are illustrated herein as being of steel construction, which is particularly satisfactory, they are of course not limited thereto. Thus wood or other suitable materials may be employed where desired. A keel 14 extends longitudinally and centrally of the hull bottom, terminating at its rearward extremity in an upstanding stern post 16. Plating 18 extends rearwardly of stern post 16 to bound the bottom of the rearward extremity of stern portion 10. A pair of curved elongate apertures 20 are provided in the sides of hull portion 10, being symmetrically disposed at either side of the hull longitudinal axis in locations normally below the ship's waterline. Received within stern portion 10 of hull 6, are a pair of curved rudder blades 22 and 24 of cylindrical segmental shape, aligned for passage through hull apertures 20 when moving into complimentary positions of projection exteriorly of the hull. Although the blades 22 and 24 are preferably of the curved shape illustrated, it should be understood that these blades may, if desired, assume a generally planar configuration or some intermediate degree of curvature.

The vessel propulsion means includes a shaft 26 journaled for rotation in stern post 16, which shaft is disposed upon the longitudinal axis of the vessel, having secured at its rearward end a propeller 28. Although but one propeller is shown, it should be understood that this is for purposes of illustration only and that a plurality of propellers, preferably symmetrically disposed relative to the rudder blades 22 and 24, may be employed compatible with the principles of this invention.

In FIGS. 1 and 3 the rearward extremity of hull portion 10 is illustrated as being of a generally semi-cylindrical gently underturned shape of a depth sufficient to bring the pair of elongated hull apertures 20 below the normal hull waterline. Hull portion 10 is, however, not limited to such shape; although it is preferable that the hull at its rearward extremity assume a generally smooth concave curve of the depth indicated.

Since the righthand or starboard quarter of the hull stern portion 10 illustrated in FIG. 1 is similar to the opposite port quarter, a description of the starboard quarter will suffice for both. Skin 12 is secured, as by welding, to vertically disposed, spaced apart, channel stiffener members 30 of the main hull side framing. In FIG. 3, members 30 are shown terminating at their lower ends at a generally horizontal sill member 32 immediately above aperture 20 and at their upper ends terminating at upper deck 31. Flooring members 34 extend transversely of the hull bottom interiorly of plating 18, and terminate at a generally horizontal sill member 36 immediately below aperture 20. Welded upon the inner flanges of certain of the stiffener members 30 are T-shaped guide members 38, FIG. 2. If desired, guide members 38 may be mounted upon other of the channel members 30 to furnish additional strength and rigidity to the rudder assembly.

A pair of watertight compartments or wells 40 and 42 are formed in the hull stern for reception of rudder blades 22 and 24. Such wells are disposed symmetrically astraddle the hull longitudinal axis, being bounded at their adjacent ends in a relatively heavy centrally disposed vertical frame member 44 and at their remote or forward ends in similar relatively heavy vertical frame members 46, members 44 and 46 serving to stiffen the hull in the vicinity of hull apertures 20. A semi-cylindrical interior hull shell 48 concentric with the similarly shaped skin 12 of hull stern portion 10 is welded interiorly of members 44 and 46 and defines the inner boundaries of wells 40 and 42. At its lower end shell 48 abuts the bottom plating 18 for watertight joinder. Vertically disposed spaced apart angle members 50 are welded interiorly of shell 48 to provide it with structural stiffening. A lower horizontal deck 52, to which the upper ends of members 50 are welded, extends the width of the hull and is edge welded thereto in watertight fashion to provide the upper watertight boundary for wells 40 and 42. Mounted upon deck 52 near either of its rear outer margins are centrally apertured packing glands 54 adapted for slidable receipt of blade guide channels 72 and screw shafts 76.

In FIGS. 1, 2 and 4 curved starboard rudder blade 24, to which blade 22 is similar, is shown comprised of a pair of concentric segmental plates 56 and 58 secured apart by means of upstanding reinforcement or spacer members 60 and closed at top and bottom by plates 62 and 64 and at the sides by plates 66 and 68. A heavy internally threaded bushing 70 is fixed to the underside of top plate 62. Channel members 72 having inturned retaining flanges 74 are fixedly secured to plate 58 at intervals corresponding to the spacing of the associated T-members 38 upon which the channels are designed to track. As above indicated, additional rudder reinforcement and guidance may be effected by provision of additional T-members which would of course entail the use of additional correspondingly spaced channel members 72.

Inasmuch as the rudder blades are similarly installed, a description of one installation will suffice for both. Rudder blade 24 is adapted for receipt within rudder well 42, as shown in FIGS. 1 and 3, with its side plates 66 and 68 spaced apart from members 44 and 46 and with the inturned flanges 74 of channel members 72 slidably gripping the flanges of T-members 38 for tracking thereover. As shown in FIG. 4, each of the channel members 72 extends upwardly a substantial distance beyond the rudder blade to which it is secured and is slidably received within a packing gland 54, FIG. 3. In certain instances it may be necessary to provide wells (not shown) extending above deck 31 for reception of the upper ends of members 72 at such times as the blade is moved upwardly into a retracted position. Stops (not shown) may be provided upon channel members 72 for interengagement with the upper surface of sill member 32 to limit the extent of downward travel of the rudder blade when moving into a fully extended position of projection beyond the hull exterior.

In FIGS. 1 and 3 separate but similar means are shown provided for individually driving the rudder blades 22 and 24 between retracted and extended positions. As typically shown for rudder blade 24, such means includes an upright elongated screw shaft 76 received at its lower end within blade 24 and journaled for rotation at its upper end in a thrust bearing 78 secured to the upper deck 31. Fixedly secured to the upper end of shaft 76 is a gear 82 in mesh with a gear 84 driven in rotation by motor 86 mounted upon upper deck 31.

Screw shaft 76 extends through packing gland 54 being threadedly received within bushing 70, the shaft lower end extending to a point near the bottom of rudder blade 24 when same is in the retracted dotted line position of FIG. 3.

The above described structural details for the mounting of the curved rudder blades 22 and 24 in the wells 40 and 42 respectively of a shaped hull stern portion, together with the screw drive means therefor, should be understood as but illustrative of many suitable installations which may be effected compatible with practice of the principles of this invention. Thus, as one such installation the rudder blades 22 and 24 may be guidably supported by the angle members 50 of the interior hull framing instead of by hull main framing members 30. With this arrangement the exterior plating 12 and the framing members 30 provide protection against damaging forces which might otherwise impair rudder functions by distorting the plating 12 and the channels 30 in the ship stern quarters. It should be apparent that as above positioned, the rudder blades are as close to the stern of the vessel as is practicably possible, and thereby exert a maximum turning moment upon the hull while at the same time occupying a minimum of usable load-carrying hull space.

In operation the rudder blades are individually driven by motors 86 between retracted and extended positions; however, the rudder blades 22 and 24 are normally retracted completely within the hull wells 40 and 42 respectively, when the ship is under way and tracking upon a straight course. This of course prevents drag from the rudder blades when their projection from the hull is not required for ship control, and is one of the advantages of the instant invention over conventional rudder installations wherein the rudder blades must remain at all times exposed in depending relation with the ship's hull. It should here be noted that the hull keel 14 may be increased in depth where necessary to provide for added hull stability which may in certain instances be required due to elimination of a rudder blade permanently positioned exteriorly of the hull.

As the hull 6 is propelled forwardly by propeller 28 driven in rotation by shaft 26, ship guidance is effected by lowering one or the other of the rudder blades 22 and 24 into an extended position of projection beyond the hull exterior surface for exposure to the water stream. Movement of each of the rudder blades is effected by a motor 86 driving a shaft 76 in rotation through meshing gears 82 and 84. Rotation of the shaft 76 within bushing 70 causes the rudder blade to move upwardly or downwardly, depending upon the direction of shaft rotation. Channels 72 with their inturned flanges 74 tracking upon the flanges of T-members 38, guide the blades through the apertures 20 in the ship hull 6, offering structural support and guidance to the blades throughout such movement and guiding same into a position immediately to the rear and to one side of the propeller 28. The turning force exerted by the rudder blade is dependent upon the amount of rudder blade area exposed to the water stream and to the angle which such exposed area makes with the stream, a maximum turning force being effected with the rudder blade in the fully extended position indicated in phantom in FIG. 3.

When it is desired to turn the bow to the left, or port, the righthand rudder 24 is lowered to project beyond the hull a distance appropriate to the desired rate of turn. Should a right or starboard turn be desired, the opposite or left rudder blade 22 is extended. It will be noted that the action of the rudder blades 22 and 24 is solely dependent upon their projected exposed areas and the angular relation of same with the water stream.

In vessel backing or moving astern, blade 24 is extended to urge the ship stern to port and blade 22 is extended to urge it to starboard. Because of their location at the extreme stern of the vessel hull 6, blades 22 and 24 are particularly effective in controlling vessel astern movement as well as vessel forward movement.

An advantage of the instant invention over conventional rudders is its ability to serve as a variable braking means for effecting checking of the vessel's forward momentum. This is accomplished by variously extending the rudder blades 22 and 24 beyond the hull 6 at the same time, the blades coacting to form a braking trough of cupshaped cross section. This trough formed by the forwardly diverging rudder blades 22 and 24 is disposed symmetrically astraddle the hull longitudinal axis immediately to the rear of propeller 28. As indicated in FIG. 1, however, the inner or rearward ends of rudder blades 22 and 24 when extended are not in abutment, but rather are maintained spaced apart a substantial distance. This permits a limited flow of water between the extended troughforming rudder blades and prevents a build-up of a stationary water mass therebetween. By so doing, there is at the same time prevented a reduction in rudder effectiveness which might otherwise occur from compaction of such mass accompanied by a streamlined flow of fluid thereabout.

This invention is particularly useful in manuevering a vessel at slow speeds, as in docking, where in the case of conventional rudders effectiveness is greatly reduced due to the limited stream flow past the rudder surfaces and the limitations inherent therein due to the forward thrust which must be exerted by a propeller upon a vessel hull in order to achieve effective control. With the instant invention adequate control at low vessel speeds is accomplished by extending each of the rudder blades 22 and 24 such that there is a differential in their projecting or exposed areas. The adjacent extended portions thereupon coact to form the above described braking trough while the lowermost or farthest projecting blade exerts a rudder effect as the force of the water stream created by propeller 28 is urged thereagainst and thence channeled past the lower edge of the uppermost blade. In this manner the forward thrust of propeller 28 is substantially reduced, the primary effect of propeller thrust being in the above indicated rudder blade action.

In FIG. 1 there is indicated by way of a phantom outline showing, a modification of the above described embodiment. Shown therein disposed in after portion 10 of hull 6 are curved rudder blades 88 and 90, similar to those previously described but with their positions reversed. Thus, the blades 88 and 90 diverge or flare rearwardly insted of forming the forward opening trough of cupshape cross section above described. The structural support, guidance and driving means for rudder blades 88 and 90 may be achieved in the fashion indicated for blades 22 and 24, or other suitable means may be provided. However, since such blades do not follow the hull contour, it will generally not be possible to utilize the main hull framing for their support and guidance and auxiliary framing must be provided.

Operation due to reversal of the blade positions will be opposite that described for rudder blades 22 and 24 with extension of the right or starboard blade 90 causing the bow to move to the right or to starboard. Extension of the lefthand blade 88 will effect a movement of the bow oppositely, or to port. Lowering of both of the rudder blades 88 and 90 into positions of projection beyond the hull will serve to check its foward movement and to a greater extent, its astern movement. Backing control is achieved by extending blade 88 for movement of the stern to port and by extending blade 90 for stern movement to starboard.

Blades 91 and 93 represent a further modification of the invention which may be employed alone, as control means auxiliary to rudders 22 and 24 or 88 and 90, or as auxiliary means for use with conventional aft positioned rudder means. It will be noted that blades 91 and 93 are similar in their curved shape and their spaced apart trough forming disposition to the blade assemblies previously described and like such assemblies, may incorporate blades of planar or intermediate curvature. Blades 91 and 93 are positioned immediately forward of the propeller 28 and serve as a particularly effective means for accomplishing vessel turning during backing. Extension of blade 93 with the vessel moving astern causes a turn to port and extension of blade 91 causes the ship to move to starboard. In forward movement blade 93 effects a turn of the vessel to port and blade 91 effects a turn to starboard.

In FIG. 1 are shown the rudder blades 92 and 94 incorporated into hull forward portion 8 at a location considerably forward of the turning axis (not shown) of the vessel. These blades are similar in their shape and cooperative disposition to the aft mounted rudder blades 22 and 24. Their use is optional depending upon the maneuverability characteristics desired of the vessel. However, as with the rearwardly flaring rudder blades 88 and 90, auxiliary support and guidance structure, which may be similar to that previously described, must generally be utilized inasmuch as these rudder blades similarly do not follow the hull contour. Operation of blades 92 and 94 need not be described in detail herein since such operation is similar to that already described with regard to rudders 22 and 24. But it should be noted that by virtue of their location forward of the ship turning axis, the blades 92 and 94 will operate oppositely to blades 22 and 24. Thus, with ship forward movement blades 24 and 92 when extended will coact to effect a vessel turn to the right and extension of blades 22 and 94 will effect a turn to the left.

A modification of the forward rudder blade assembly is shown in FIG. 1 in which blades 95 and 97 shaped similarly to but provided in lieu of blades 88 and 90 are disposed astraddle the ship's longitudinal axis with their forward ends spaced apart. Like the blades 88 and 90, their use is optional and intended as an auxiliary means of control only. Because of their opposite disposition, blades 95 and 97 will act in reverse fashion to blades 92 and 94. It will be noted, however, that blades 95 and 97 are particularly effective as an astern movement checking means when extended to form a rearwardly flaring trough.

It is particularly desirable to provide a ship with both a forward and a rearward set of rudder blades, for instance blades 22, 24, 95 and 97 in FIG. 1 since the two pairs of rudder blades may be used advantageously to effect maneuvers of the ship which have been heretofore impossible with conventional rudders. Thus, a ship moving up to or away from a pier can, by lowering opposite bow and stern rudders, maneuver laterally while remaining parallel to the pier. When rudders 24 and 95 are lowered together the ship can be moved to port toward or away from a pier or another ship while remaining parallel to the pier or other ship.

In FIG. 5 intermediate the pairs of rudder blades 22 and 24 and 92 and 94 are shown pairs of similarly shaped cylindrical segmental stabilizer blades 96 and 98, and 100 and 102 disposed at either side of vessel hull 6. Like the other blades heretofore described, the stabilizer blades are preferably curved, as shown, but may, like such blades, assume a substantially planar shape or an intermediate curvature. As shown in FIG. 5, the stabilizer blades are in retracted positions within the hull, being positioned for transverse movement into extended positions exteriorly of the hull at levels below the normal hull waterline. No specific support structure or driving means is indicated for the stabilizer blades, a wide latitude being here available, as is similarly the case with the other blade installations above described. However, when their use is not required, the stabilizer blades should be fully retractable so as to be contained completely within the vessel hull in suitable hull wells in order to eliminate unnecessary drag.

The stabilizer blades are operatively connected together in opposed inverted pairs, i.e., the upper blade 96 on the port side of the hull 6 is operatively connected with the lower blade 102 on the starboard side and the remaining pair of blades 98 and 100 are similarly connected.

In operation both of the blades of the connected pair are generally extended to travel laterally into positions projected exteriorly of the hull sides. As with the rudder blades, the exposed area of each pair of the stabilizer blades may be varied, depending upon the righting moment desired from each. Although the blades may be extended singly, it is most generally preferable to utilize them in coacting pairs with the blades complementing each other to form a couple, i.e., exerting complementary righting moments upon hull 6.

It is a valuable advantage of all of the rudder blades of the invention that the rudder blade can be moved into and out of maneuvering positions with a minimum force and hence with a motor 86 or the like of minimum power since the force applied to move the rudder is directed at approximately right angles to the maneuvering force applied to the rudder blade by the water. This characteristic of the control system of this invention makes the use of the control system particularly advantageous on ships and smaller crafts in which the rudder is controlled manually; not only is the work of changing rudder positions made easier but also the helmsman of the craft need not maintain a force against the rudder to hold it in place or maintain fluctuating forces on the rudder when the craft is in heavy seas.

The rudder blades in the control system of this invention are more efficient than conventional rudder blades of similar area due to the curvature of the blades described above. For instance, the blade 24 in FIG. 2 obtains the effectiveness of a flat blade of similar area plus the effectiveness derived from the pressure differential between the fluid streams on opposite sides of the curved blade; with the blades arranged as described so that the blades are concave on the leading face of the blade, these effective functions of the blade are additive.

It will be appreciated that the embodiments of the invention herein described may be altered, changed, or modified, and that additional structural elements may be added to the control system without departing from the spirit and scope of the invention. Illustrative of such changes may be the provision support means for the rudder blades below the hull of the vessel, such as the provision of structure for mounting one edge of each of the stern rudder blades for support on a conventional rudder post. Accordingly, the invention is defined by the following claims.

What is claimed is:

1. In a water craft comprising a hull defining a path for water flow around said craft and having a stern end and propulsion means mounted on said hull and positioned in said path adjacent to said stern end of said hull for generating a stream of water past said hull, said hull having a central longitudinal axis generally parallel to said water path and a horizontal load line to which said hull sinks in water when loaded, the improved control means for said craft comprising: a pair of generally vertically extending wells in said hull adjacent to said stern end of said hull and positioned between said propulsion means and said stern end with said wells being opened at their lower ends communicating with said water path, a pair of rudder blades mounted in said wells for generally vertical reciprocal movement between positions substantially completely inside said wells and positions extending from said wells and into said water stream below said load line, said blades being inclined to a vertical plane through said axis and having concave leading sides and convex trailing sides which terminate in leading and trailing edges in said flow stream, said blades being mounted as substantially mirror images of each other in said vertical plane and being positioned to permit substantial fluid flow over their leading and trailing edges when said blades are positioned in said flow stream, and means for moving said blades independently of each other along linear paths into and out of said wells while maintaining said blades inclined to said plane.

2. The improved control system of claim 1 characterized further in that said stern end of said hull has a continuous convex surface adjacent to said trailing sides of said blades; and said blades are positioned parallel to said convex surface of said hull whereby said blades when they are both positioned in said flow stream, define a generally cup-shaped cavity for receipt of said flow stream; and said trailing edges of said blades are spaced apart from each other on opposite sides of said vertical plane thereby providing a central slot in said cup for horizontal water egress from said cup.

References Cited in the file of this patent

UNITED STATES PATENTS

| | | |
|---|---|---|
| 1,061,088 | Laurenti | May 6, 1913 |
| 1,195,149 | Ollard | Aug. 15, 1916 |
| 1,264,320 | Metzler | Apr. 30, 1918 |
| 1,751,278 | Kefeli | Mar. 18, 1930 |
| 1,799,455 | Cavert | Apr. 7, 1931 |
| 2,507,790 | Kern | May 16, 1950 |

FOREIGN PATENTS

| | | |
|---|---|---|
| 1,063,130 | France | Dec. 16, 1953 |